United States Patent [19]
Allain et al.

[11] 3,983,224
[45] Sept. 28, 1976

[54] ANHYDROUS MAGNESIUM CHLORIDE PROCESS

[75] Inventors: Ronald J. Allain; David G. Braithwaite, both of Brookhaven, Miss.

[73] Assignee: Nalco Chemical Company, Oak Brook, Ill.

[22] Filed: Apr. 26, 1976

[21] Appl. No.: 680,403

[52] U.S. Cl................................ 423/498; 423/356; 423/413; 260/635 R; 423/351
[51] Int. Cl.$^2$............................................. C01F 5/34
[58] Field of Search............ 423/498, 413, 356, 351

[56] References Cited
UNITED STATES PATENTS

| | | | |
|---|---|---|---|
| 3,092,450 | 6/1963 | Christensen | 423/498 |
| 3,352,634 | 11/1967 | Buchman | 423/498 |
| 3,594,120 | 7/1971 | Bott et al. | 423/498 |

*Primary Examiner*—Edward Stern
*Attorney, Agent, or Firm*—John G. Premo; Robert A. Miller; Barry W. Sufrin

[57] ABSTRACT

Anhydrous magnesium chloride may be prepared for magnesium chloride hydrate by the following sequence of process steps:

A. Mixing together a magnesium chloride hydrate said hydrate containing minor amounts of water soluble sulfate and boron compounds as impurities with diethyl ether of tetraethylene glycol to prepare 0.1 – 6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;

B. Distilling water from said slurry wherein an anhydrous solution of $MgCl_2$ in diethyl ether of tetraethylene glycol containing the water soluble sulfate and boron compounds as insoluble impurities is formed;

C. Separating said $MgCl_2$ solution from the insoluble impurities;

D. Adding to the $MgCl_2$ solution about 3.0 moles of ethylene glycol per mole of $MgCl_2$ present so as to prepare a $MgCl_2 \cdot 3$ moles ethylene glycol complex precipitate;

E. Separating precipitate pecipitate from the diethyl ether of tetraethylene glycol and recovering the precipitate;

F. Dissolving said precipitate in ethylene glycol to prepare a solution of the precipitate in ethylene glycol said ethylene glycol being used in a quantity so as to prepare an ethylene glycol solution containing from 1 to 20% by weight $MgCl_2$;

G. Treating the ethylene glycol magnesium chloride solution with ammonia to form a magnesium chloride-ammonia complex which is insoluble in the ethylene glycol with the temperature of the ethylene glycol magnesium chloride solution being within the range of between −15° to 50°C;

H. Separating the magnesium chloride-ammonia complex from the ethylene glycol;

I. Washing the magnesium chloride-ammonia complex with a polar solvent having a lower boiling point than ethylene glycol to remove any ethlene glycol entrained in the magnesium chloride-ammonia complex;

J. Heating the magnesium chloride-ammonia complex to a temperature sufficient to drive off the ammonia for a sufficient period of time to remove the ammonia, thereby forming anhydrous magnesium chloride; and then, K. Recovering anhydrous magnesium chloride which has a magnesium oxide content of less than 0.8% by weight and which is substantially free of impurities.

7 Claims, No Drawings

ANHYDROUS MAGNESIUM CHLORIDE PROCESS

INTRODUCTION

One method of producing magnesium metal is by electrolyzing a molten salt bath in a cell which contains magnesium chloride. Hydrated magnesium chloride when used as a cell feed decreases the electrical efficiency of the cell. Also, hydrated magnesium chloride tends to produce oxides of magnesium which form a sludge which must be periodically removed from the cell. Excellent cell efficiency can be achieved if the magnesium chloride cell feed is completely anhydrous. Thus, if it were possible to feed completely anhydrous magnesium chloride to electolytic cells used to produce magnesium, magnesium yields would be improved.

Many investigators have attempted to produce anhydrous magnesium chloride using a variety of schemes. One generalized approach dissolving hydrated magnesium chloride into an organic solvent, particularly polar organic solvents, to form a hydrated magnesium chloride solution. These solutions have been either heated or reacted with a precipitant which is heated to ostensibly remove the water from the magnesium chloride. A careful study of these various techniques shows them to be deficient in many respects.

A method often proposed for producing anhydrous magnesium chloride is to dissolve hydrated magnesium chloride into methanol and then heat this solution to expell water and methanol, thereby purportedly leaving as a distillation residue anhydrous magnesium chloride. The difficulty with such a procedure is explained in U.S. Pat. No. 3,440,006. This patent indicates that when the hydrated magnesium chloride solution complex is heated to remove the alcohol and water, severe decomposition of both the alcohol and magnesium chloride occurs. This produces an end product which contains large amounts of carbon and magnesium oxide. Such a product is a poor cell feed for the electrolytic production of magnesium metal from a magnesium salt bath.

Several of the more interesting schemes for producing anhydrous magnesium chloride which rely upon the solubility of magnesium chloride hydrates in a polar organic solvent are described in U.S. Pat. Nos. 2,381,994; 2,381,995 and 3,352,634.

U.S. Pat. No. 2,381,994 sets forth a technique whereby a hydrated magnesium chloride is dissolved in a monohydroxy saturated aliphatic alcohol which has a boiling point about 220°F. This solution is then heated to distill off the water and then is further heated to remove by distillation the remainder of the monohydroxy saturated aliphatic alcohol. When this procedure is followed, as is the case with the use of methanol as a solvent, the finished product contains quantities of magnesium oxide and carbon which indicates substantial decomposition of the alcohol occurs.

U.S. Pat. No. 2,381,995, which builds upon the teachings of U.S. Pat. No. 2,381,994, relies upon dissolving a hydrated magnesium chloride in a monohydroxy saturated aliphatic alcohol. This solution is then heated for a period of time sufficient to drive off the water present. The alleged water-free solution is treated with ammonia to precipitate a magnesium chloride ammonia complex which is then separated from the alcohol and heat-treated to drive the ammonia from the complex.

The difficulties experienced in actually practicing the techniques of U.S. Pat. No. 2,381,995 readily indicate to one skilled in the art that its method is inherently incapable of being adapted to large-scale commercial operations.

In the first instance, when the alcohol solution of the hydrated magnesium chloride is heated to remove water therefrom, it is impossible to remove the water at about the boiling point of the alcohol employed. This is particularly true when isoamyl alcohol is used as the solvent for the hydrated magnesium chloride. Thus, the magnesium chloride is not fully dehydrated. When the alleged water-free magnesium chloride is ammonia precipitated from the alcohol as suggested by the patentee in U.S. Pat. No. 2,381,995, a dense wax-like precipitate occurs which contains large quantities of entrained alcohol. The density and wax-like character of the precipitate renders it incapable of being handled by commercial equipment to free the precipitate of entrained solvent. Thus, it is impossible to further process the precipitate without substantial losses of the solvent taking place during the ammonia removal phase of the process.

U.S. Pat. No. 3,352,634 is for all intent and purposes identical in its teachings to U.S. Pat. No. 2,381,995. The differences relate only to minor points. In one instance, the patentee suggests using a hydrocarbon liquid with the hydrated magnesium chloride solvent to aid in removing the water of hydration during the distillation step of the process. The patenteee also suggests cooling the alleged water-free mixture prior to ammonia addition which increases the solubility of the ammonia in the so-called water-free magnesium chloride solvent solution.

The patentee, while listing a large number of solvents such as isoamyl alcohol and other monohydric alcohols, also suggests using other oxygentated solvents for dissolving the hydrated magnesium chloride and generically suggests ketones, glycols and diketones.

The only example set forth in this patent utilizes isoamyl alcohol. As previously indicated, isoamyl alcohol is incapable of completely dehydrating the hydrated magnesium chloride which is initially dissolved therein and, also, the ammonia complex which is precipitated therefrom is physically incapable of being further processed to release the magnesium chloride therefrom.

U.S. Patent application Ser. No. 626,813 filed Oct. 29, 1975 to the same assignee as the instant application discloses a satisfactory method of preparing anhydrous magnesium chloride from essentially pure magnesium chloride sources using ethylene glycol as a solvent, the formation of an ammonia complex with the magnesium chloride and the decomposition of this material to prepare the anhydrous magnesium chloride. While this process prepares a satisfactory anhydrous magnesium chloride for electrolytic reduction to the metal, water soluble sulfate and boron impurities which are present in many magnesium brine solutions such as those found in the Great Salt Lake are not removed by this process and contaminates the resultant anhydrous magnesium chloride. Our research has shown that the process as described herein as our invention prepares a magnesium chloride product suitable for electrolytic reduction which is both anhydrous and substantially free of water soluble sulfate and boron compounds as impurities.

The general method by which we conduct our process includes adding to the brine or magnesium chloride hydrate source a solvent of diethyl ether of tetraethylene glycol (DETEG); and then, heating to remove the water. Once the $MgCl_2$ — DETEG solution is anhydrous, the $MgCl_2$ will solubilize. This solution is then separated to remove insoluble impurities including $SO_4^=$, B and alkali metal chlorides. The resultant $MgCl_2$ — DETEG solution is then treated with ethylene glycol to produce a magnesium chloride ethylene glycol complex precipitate; and separating this complex precipitate from the solvent and dissolving it in ethylene glycol. The mixture is then treated with ammonia to prepare a magnesium chloride-ammonia precipitate which is then separated from the solution and heated to prepare an anhydrous magnesium free chloride.

Prior art besides that cited earlier believed relevant to the instant invention includes Ser. No. 825,963 filed May 19, 1969 now abandoned. This application discloses the use of an azeotropic distillation to remove water from a solution of magnesium chloride in a water soluble heterocyclic nitrogen base. Useful azeotropic agents include but are not limited to toluene, benzene anad xylene. U.S. Patent application Ser. No. 76,251 filed Sept. 28, 1970 and now abandoned discloses the preparation of anhydrous magnesium chloride from the hydrate alkali metal or ammonia double chloride salts.

U.S. Pat. No. 3,594,120 discloses a method for the preparation of anhydrous magnesium chloride from a solution of magnesium chloride dissolved in a diethyl ether of tetraethylene glycol/tetrahydrofuran cosolvent product in a waste stream of the so called "Nalco-Freeport" process for the preparation of organo lead compounds. It must be pointed out, however, that there were no boron or sulfate contaminates in this feed and while diethyl ether of tetraethylene glycol was used as a cosolvent, no purification step or dehydration step was necessary since the feed itself was anhydrous from the preceeding grignard reaction.

U.S. Pat. No. 3,447,889 discloses a method of treating magnesium hydrate slurries to produce magnesium oxide having low boron impurity levels. This patent deals with carbonating a magnesium hydroxide slurry containing boron, precipitating magnesium carbonate hydrate and separating and washing this material so as to remove the soluble boron compounds. No method of preparing the anhydrous material is discussed in this reference.

U.S. Pat. No. 3,440,006 mentioned above discloses a method of preparing a substantially magnesium oxide free anhydrous magnesium chloride which comprises mixing a saturated solution of anhydrous magnesium halide and an absolute alkanol with a cycle aliphatic ether; separating the precipitate formed by such mixture and dissolving the precipitate to recover the anhydrous magnesium halide. Cyclic ethers used by the patentee include dioxane, tetrahydrofuran and alkyl or phenol derivatives of the cyclic ethers which form magnesium halide complexes which are insoluble in the alkanol. As discussed above, this reference prepares a $MgCl_2$ having high levels of carbon and MgO.

U.S. Pat. No. 3,433,604 discloses a method for separating calcium and boron values from magnesium chloride brines. The patentee in this case treats a magnesium chloride brine with one or more water immiscible organic extraction agents. These water immiscible extraction agents having a selectivity toward calcium and boron include substituted catechols and aliphatic vicinal dialcohols containing 8–20 carbon atoms. While a magnesium chloride brine free of impurities was obtained, large volumes of the solvents would have to be employed; and additionally, the impurities would have to be removed from the extractants by distillation or other means so that the extractants could be recycled on an economical basis.

U. S. Pat. No. 3,419,347 discloses a method of preparing anhydrous magnesium chloride by adding a substantially anhydrous monohydric alkanol containing 2–5 carbon atoms to a methanol solution of magnesium halide, trans-solvating removal of at least part of the methanol and then adding a cyclic ether containing 5–6 carbon atoms to form diligand and decomposing this material to produce an anhydrous magnesium chloride. While this process also prepares an anhydrous magnesium chloride, substantial loss in organic solvents occur in this process of both the monohydric alkanol and cyclic ether; especially during the decomposition step.

U.S. Pat. No. 3,490,880 to Charlesworth discloses a method for purifying magnesium an calcium chloride aqueous brines containing sodium or potassium impurities by contacting the brine with a water soluble monohydric or dihydric alkanol containing 4–20 carbon atoms to extract the alkali metal values and recover an aqueous purified $MgCl_2$ brine.

U.S. Pat. No. 3,424,562 deals with a method for separating halate salt solutions containing halide and to the separating of alkali metal halates whose solubility in water on a weight basis is not as great as that of the corresponding halide in water, from aqueous solutions containing these salts by adding sufficient amounts of an alkanol to selectively precipitate a major portion of the halate salt and separating the precipitate from the mixture. Among the alkanols mentioned in this reference are water soluble monohydric or polyhydric alcohols including ethylene glycol. It is noted, however, that methanol and ethanol are the preferred extractants, and no mention is made of preparing an anhydrous material, or a glycol complex with the metals.

U.S. Pat. No. 3,359,076 discloses a method for the recovery of potassium halides from brines containing sodium chloride, calcium chloride and other organic halides by the addition to the brine solution of a polar Lewis base type solvent and subsquently separating the potassium halide from solution. Among the low molecular weight Lewis based type solvents which the patentee suggests includes the use of ethylene glycol. Relying on selective solubility or insolubility of the potassium halides, ethylene glycol or other polar solvents again especially ethanol or methanol precipitates the potassium salt leaving the others in solution.

U.S. Pat. No. 3,357,800 discloses a method for purifying magnesium chloride hydrates using alcohols. This extraction technique according to the patentee yields an alcoholic solution of magnesium chloride hydrate substantially free of impurities. This patent also relies on selective solubility of the magnesium chloride in the alkanol.

U.S. Pat. No. 3,341,282 discloses a method for the preparation of anhydrous magnesium chloride using alcohol and ammonia. The process is carried out by heating carnallite to dehydrate it, dissolving the dehydrated magnesium chloride in a solvent, filtering the solution to remove undissolved impurities including alkali metal chlorides and then treating the resultant $MgCl_2$ solution with ammonia gas to precipitate magnesium chloride-ammoniate and finally decomposing the magnesium chloride ammoniate to prepare anhydrous magnesium chloride. Again, heating by itself is believed insufficient to completely dehydrate the $MgCl_2$ and solvent losses occur when the $MgCl_2$—$NH_3$ complex is decomposed.

U.S. Pat. No. 2,666,774 discloses insoluble complexes of group II metals such as calcium and magnesium with certain polyhydroxide ethers. These compounds are stated to be non-hydroscopic and the patentee states that they may be prepared by simply adding the compounds together. Diethylene glycol is disclosed as one of the complexing agents.

From the above disclosures it may be seen that even though several generic procedures have been presented for anhydrous magnesium chloride, they are incapable of so doing for the several reasons discussed above. In our process it is possible to produce a completely anhydrous magnesium chloride which contains less than 0.8% by weight of magnesium oxide and is substantially free from water soluble boron, chloride and sulfate compounds as impurities. Our process uses readily available commercial chemicals which are capable of recovery and recycling in the process without the loss of any of the ingredients.

Our process has a further advantage of allowing magnesium chloride to be produced without any hydrochloric acid thus making the use of a corrosion-resistant expensive alloys and an unnecessary part of commercial scale unit for practicing the process.

OBJECTS

It is, therefore, an object of our invention to provide to the art an economical method for the preparation of anhydrous magnesium chloride.

A further object of our invention is to provide to the art a method for the preparation of anhydrous magnesium chloride containing substantially no water soluble sulfate or boron compounds as impurities.

A still further object of our invention is to provide to the art a method for the preparation of anhydrous magnesium chloride using recyclable solvents which will provide a magnesium chloride suitable for the electrolytic reduction to magnesium metal.

THE INVENTION

In accordance with our invention, anhydrous magnesium chloride is prepared in accordance with the following steps:

A. Mixing together a magnesium chloride hydrate said hydrate containing minor amounts of water soluble sulfate and boron compounds as impurities with diethyl ether of tetraethylene glycol to prepare 0.1–6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;
B. Distilling water from said slurry wherein an anhydrous solution of $MgCl_2$ in diethyl ether of tetraethylene glycol containing the water soluble sulfate and boron compounds as insoluble impurities is formed;
C. Separating said $MgCl_2$ solution from the insoluble impurities;
D. Adding to the $MgCl_2$ solution about 3.0 moles of ethylene glycol per mole of $MgCl_2$ present so as to prepare a $MgCl_2 \cdot 3$ moles ethylene glycol complex precipitate;
E. Separating said precipitate from diethyl ether of tetraethylene glycol and recovering the precipitate;
F. Dissolving said precipitate in ethylene glycol to prepare a solution of the precipitate in ethylene glycol said ethylene glycol being used in a quantity so as to prepare an ethylene glycol solution containing from 1 to 20% by weight $MgCl_2$;
G. Treating the ethylene glycol magnesium chloride solution with ammonia to form a magnesium chloride ammonia complex which is insoluble in the ethylene glycol with the temperature of the ethylene glycol magnesium chloride solution being within the range of between −15° to 50°C;
H. Separating the magnesium chloride-ammonia complex from the ethylene glycol;
I. Washing the magnesium chloride-ammonia complex with a polar solvent having a lower boiling point than ethylene glycol to remove any ethylene glycol entrained in the magnesium chloride-ammonia complex;
J. Heating the magnesium chloride-ammonia complex to a temperature sufficient to drive off the ammonia for a sufficient period of time to remove the ammonia, thereby forming anhydrous magnesium chloride; and then,
K. Recovering anhydrous magnesium chloride which has a magnesium oxide content of less than 0.8% by weight and which is substantially free of impurities.

In order to further disclose our invention, the following detailed description of the individual steps is given:

A. A hydrated magnesium chloride containing boron and sulfate water soluble impurities is placed in diethyl ether of tetraethylene glycol (DETEG) to form a DETEG magnesium chloride hydrate slurry. The amount of magnesium chloride which is dissolved in the DETEG may vary from between 0.1–6.0% by weight although it is preferred in the practice of our invention that the amount of magnesium chloride be within the range of 3.0–6.0% (as $MgCl_2$) by weight of the solution.

The most common hydrate that would be used in the practice of our invention would be $MgCl_2 \cdot 6 H_2O$. While this is the most common form available, it is understood that other hydrates may be used. One known hhydrate is the so-called 1.5 mole hydrate which is produced by roasting the 6 mole hydrate at elevated temperatures.

Magnesium chloride as produced commercially often contains other salts such as calcium salts or potassium salts. Illustrative of such a mixture is carnallite which is a mixture of magnesium chloride and potassium chloride which contains 6 moles of water. The salts which often times are present with commercial magnesium chloride hydrates vary depending upon the source from which they are obtained.

Other common impurities which may be present in the magnesium chloride brine include water soluble sulfates such as sodium sulfate and water soluble boron impurities such as borax which can cause a loss of efficiency when the anhydrous magnesium chloride is subjected to an electro-chemical means to prepare magnesium metal.

The magnesium chloride brine employed in our invention may be as diluted or concentrated as desired. Likewise, the moles of water of hydration of the magnesium chloride which may be subjected to our invention may vary. One may start with $MgCl_2 \cdot 2H_2O$ or an aqueous solution of magnesium chloride and water. The only limitation being that for each mole of water remaining in the magnesium brine which is introduced into the process of our invention, an azeotropic agent would have to be added and the additional water would have to be removed. It is, therefore, a preferred step within our invention to start with magnesium chloride hydrate which is as dry as reasonably permitted without complicated or expensive drying steps.

The magnesium chloride hydrate slurry and DETEG is then subjected to a distillation step to remove the water. This step may be conducted at atmospheric or reduced pressures so as to distill the water. Since organic solvents are involved, it is preferred to maintain the temperature as low as possible and hence distilling water under reduced pressure is preferred.

In a preferred practice of our invention, the magnesium chloride hydrate slurry in DETEG is subjected to azeotropic distillation of the water present in the starting brine. The amount of azeotropic agent added to the solution of magnesium chloride and DETEG will vary depending on the amount of water present in the starting magnesium chloride hydrate brine. It is important that as little azeotropic agent as necessary be used due to the cost of removing this material at a later step. Suitable azeotropic agents include any water immiscible compound which when mixed with water will produce an azeotrope containing water and the azeotropic agent and which boils at a lower boiling point than the DETEG. Suitable azeotropic agents include benzene, toluene and xylene. A preferred azeotropic agent is toluene.

While the quantity of azeotropic agent necessary is directly proportionate to the amount of water present in the magnesium chloride brine used, we have generally found that there should be a slight excess of azeotropic agent based on the amount of water present. As an example, when toluene is used, approximately 1.3 moles of toluene should be added to the DETEG solution for each mole of water present. While greater or lesser amounts of the azeotropic agent will also perform, it is advised not to use excess amounts since this material should be recycled and excess amounts will have to be distilled or otherwise removed from the DETEG.

B. The magnesium chloride hydrate is mixed with DETEG and is heated to distill the water contained in the magnesium chloride hydrate. This distillation step is preferably conducted at reduced pressure, and should continue until all of the magnesium chloride is dissolved in the DETEG, this generally not occurring until the solution is substantially anhydrous. While the exact temperature at which the water distills will depend upon pressure, the amount of solvent, and impurities in the magnesium chloride brine selected, a temperature range of 50°–170°C is generally utilized.

When a preferred method of removing water in our invention is practiced, that is azeotropically distilling water, the magnesium chloride hydrate is mixed with DETEG and the azeotropic agent, and is heated to distill the water contained in the magnesium chloride hydrate. This distillation step should continue until all of the magnesium chloride has dissolved in the DETEG, this generally not occurring until the solution is substantially anhydrous. The distillation step should be continued to remove as much as the azeotropic agent as possible; although, the presence of small quantities of the azeotropic agent will not be harmful in later steps. When using a toluene azeotrope, the drying will be effective at 150°–170°C. As will be seen by those skilled in the art, the selection of an azeotropic solvent is a matter of choice and the temperature at which the azeotrope will distill can be readily determined by those skilled in the art.

C. In the third step of our invention, the now soluble magnesium chloride solution in the DETEG is separated from material not dissolved in the solvent. It has been found that this insoluble mixture when removed contains sulfate, chloride and boron values which are undesirable impurities in the manufacture of magnesium metal by electrolysis. This separation can be conducted in any number of known ways such as filtration, centrifugation, or sedimentation. The insoluble impurities collected, sodium, sulfate, borax, etc. are disgarded, while the solution of magnesium chloride and DETEG is held for further processing.

D. The fourth step of our invention involves adding about 3.0 moles of ethylene glycol per mole of magnesium chloride present to the DETEG/$MgCl_2$ solution. The magnesium chloride 3 mole ethylene glycol complex precipitates out of the solution as an ahydrous material. While one can add as much ethylene glycol as desired at this step, we have found that at least 2.5 moles per mole of magnesium chloride should be added and preferably from 2.5–3.0 moles of ethylene glycol per mole of magnesium chloride. Most preferably 3 moles of ethylene glycol are added per mole of $MgCl_2$. The addition of excess ethylene glycol is not favored due to the fact that it will be left in the DETEG which will be recycled to the first step of our invention. If ethylene glycol remains in the DETEG and the DETEG is recycled, it will be effectively lost since it will azeotropically distill with the water in step B and be in the water phase. Thus in order to cut solvent losses and still maintain a good product, it is important that no more than 3 moles of ethylene glycol solution be added if the solvent is to be economically recovered.

E. Magnesium chloride-ethylene glycol complex precipitate is then separated from the DETEG again by any number of known means such as filtration or centrifugation. The filtrate of DETEG is recovered and is recycled to Step 1. The remaining precipitate is held for further treatment. The DETEG is the filtrate in this step is returned and recycled as is. There is no need to further purify this material since small traces of water, ethylene glycol or azeotropic agent used will not interfere with this invention. Any ethylene glycol, azeotropic agent or water remaining in the DETEG will be removed when the DETEG is recycled and is azeotropically distilled in step A.

F. The precipitate of $MgCl_2$/ethylene glycol complex is then dissolved in excess ethylene glycol from a solution of from 1–20% by weight magnesium chloride and preferably from 2–15% by weight magnesium chloride to solubilize the material. Most preferably from 8–12% $MgCl_2$ is dissolved in the ethylene glycol. This material is anhydrous at this point and water vapor should be kept away from the solution.

G. The anhydrous ethylene glycol magnesium chloride solution is then cooled to about −15°–50°C and, preferably, within the range of 0°–25°C. At this point the solution is treated with anhydrous ammonia to provide at least 6 moles of ammonia and, preferably at least 9 moles of ammonia per mole of magnesium chloride present in the ethylene glycol solution. The ammonia addition can be relatively rapid although in small-scale laboratory preparations, the ammonia addition should take place over a period of time ranging between 1–2 hours. The ammonia addition can begin by treating the hot solution thus aiding to cool the solution to the temperature indicated.

It was found that by cooling the magnesium chloride ethylene glycol solution to the temperature indicated that the ammonia is more soluble therein and that a precipitate does not form until at least 6 moles of the ammonia have been added. After most of the ammonia is added to the glycol, a fine, white grainy precipitate begins to form which is a water-free ammonia complex of the magnesium chloride. This fine precipitate is readily separated from the ethylene glycol where it is then subject to further processing.

H. The precipitated magnesium chloride ammonia complex is separated from the glycol solution by any known means such as decantation, filtration, centrifugation or combinations of such means. It is, of course, necessary that the separation be conducted in a water-free atmosphere which may be provided by gases such as nitrogen, argon or the like. The separated ethylene glycol can be recycled to form the $MgCl_2$-ammoniate or can be used to dissolve the complex without further purification.

I. The precipitate is now washed with a low boiling point polar solvent, e.g. one having a lower boiling point than ethylene glycol, which is capable of removing the ethylene glycol entrained in the precipitate. Such solvents include methanol or ethanol with methanol being preferred. Certain ethers such as tetrahydrofuran or ethyl ether may be used. The wash solvent should not be a solvent for the precipitate.

J. After the glycol is extracted with the low boiling point solvent, the glycol-free magnesium chloride ammonia complex is slowly heated to within the range of 300°–400°C. for a period of time sufficient to completely remove the ammonia which leaves as a residue a completely anhydrous magnesium chloride. In large-scale operations, the ammonia as well as the wash solvent released by this heat treatment step would be recovered for reuse.

K. By practicing the above steps, it is possible to produce a magnesium chloride which is completely water-free and has a magnesium oxide content less than 0.8% by weight. In most instances, the magnesium oxide content will be 0.5% or less. The magnesium chloride thus recovered from the process provides an excellent cell feed for producing magnesium metal.

In order to illustrate this invention, the following example was performed:

To a five-liter flask fitted with stirrer and a reflux condenser with a water separator attached is charged 275g of $MgCl_2 \cdot 2H_2O$ that contains 3.% $SO_4^{--}$ and 525 ppm B as impurities, 3500g DETEG and 500g toluene. The contents are heated to a point where toluene azeotropically removes all of the water. The pot temperature is 150°–175°C. When the system is anhydrous then (and only then) the $MgCl_2$ is solubilized in the DETEG. The majority of the impurities are insoluble. The mixture is filtered hot. The precipitate analyzes high in $SO_4^{--}$ and B. The filtrate is cooled to less than 100°C and 390g of ethylene glycol is added dropwise. (The amount of glycol added corresponds to a 3:1 mole ratio of glycol:$MgCl_2$). The $MgCl_2 \cdot 3$ ($HOCH_2CH_2OH$) complex that forms is insoluble and falls out as a white crystalline compound. The $MgCl_2$/glycol complex is removed from the DETEG by filtration. To this complex is added 1410g of dry ethylene glycol. The complex dissolves giving a 10% $MgCl_2$ solution in ethylene glycol.

The resulting solution of magnesium chloride in ethylene glycol would then be cooled in a ice bath until the temperature had reached 15°C. To this cooled reaction flask would then be added approximately 320g of anhydrous ammonia over a one-hour period. This would represent 1½ times the stiochiometric amount oof ammonia necessary for the amount of magnesium chloride present. After the first half hour of addition, a fine grainy precipitate would begin to form and would continue to form for about 15 minutes. Ammonia would then be added for an additional 15 minutes.

The contents of the flask which was a magnesium chloride ammonia complex slurry in ethylene glycol would then be removed from the flask, placed into a Buchner funnel and filtered. This would be accomplished by maintaining the Buchner funnel under an ammonia atmosphere to prevent moisture contamination. After filtering, the filter cake would be washed with approximately 1 liter of methanol and allowed to drain. It would then be rewashed with an additional 250 milliliters of methanol. An analysis of the filter cake would show it to contain approximately 49.9% magnesium chloride, approximately 42.1% ammonia and no water. The complex precipitate so formed would then be added to a 5 liter, 3-neck flask equipped with a stirrer, gas inlet line, and an exit port. The contents of the flask would be swept with anhydrous ammonia while the temperature of the contents of the flask would be elevated to between 250°–350°C. At this point, the ammonia feed would be stopped and argon would be fed into the flask. The flask would then be slowly heated to 400°C. At the end of this time, the heating would be discontinued and the contents of the flask removed and analyzed. An analysis showed that the fine, white powder that remained was 99.5% completely anhydrous magnesium chloride which contained 0.5% magnesium oxide. The precipitate would also be analyzed and would be found free of $SO_4$ and would contain less than 15 ppm boron.

We claim:
1. A method of preparing anhydrous magnesium chloride from magnesium chloride hydrates which comprises the steps of:
   A. mixing together a magnesium chloride hydrate said hydrate containing minor amounts of water soluble sulfate and boron compounds as impurities with diethyl ether of tetraethylene glycol to prepare 0.1–6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;
   B. distilling water from said slurry wherein an anhydrous solution of $MgCl_2$ in diethyl ether of tetraethylene glycol containing the water soluble sulfate and boron compounds as insoluble impurities is formed;
   C. separating said $MgCl_2$ solution from the insoluble impurities;
   D. adding to the $MgCl_2$ solution about 3.0 moles of ethylene glycol per mole of $MgCl_2$ present so as to prepare a $MgCl_2 \cdot 3$ moles ethylene glycol complex precipitate;

E. separating said precipitate from the diethyl ether of tetraethylene glycol and recovering the precipitate;

F. dissolving said precipitate in ethylene glycol to prepare a solution of the precipitate in ethylene glycol said ethylene glycol being used in a quantity so as to prepare an ethylene glycol solution containing from 1 to 20% by weight $MgCl_2$;

G. treating the ethylene glycol magnesium chloride solution with ammonia to form a magnesium chloride-ammonia complex which is insoluble in the ethylene glycol with the temperature of the ethylene glycol magnesium chloride solution being within the range of between −15° to 50°C;

H. separating the magnesium chloride-ammonia complex from the ethylene glycol;

I. washing the magnesium chloride-ammonia complex with a polar solvent having a lower boiling point than ethylene glycol to remove any ethylene glycol entrained in the magnesium chloride-ammonia complex;

J. heating the magnesium chloride-ammonia complex to a temperature sufficient to drive off the ammonia for a sufficient period of time to remove the ammonia, thereby forming anhydrous magnesium chloride; and then, K. recovering anhydrous magnesium chloride which has a magnesium oxide content of less than 0.8% by weight and which is substantially free of impurities.

2. A method of preparing anhydrous magnesium chloride from magnesium chloride hydrates which comprises the steps of:

A. mixing together a magnesium chloride hydrate said hydrate containing minor amounts of water soluble sulfate and boron compounds as impurities with diethyl ether of tetraethylene glycol to prepare 0.1–6.0% by weight slurry of $MgCl_2$ in the diethyl ether of tetraethylene glycol aand an azeotropic agent having a boiling point less than the diethyl ether of tetraethylene glycol in a quantity sufficient to remove water from said slurry;

B. azeotropically distilling from said slurry the water and azeotropic agent wherein an anhydrous solution of $MgCl_2$ in diethyl ether of tetraethylene glycol containing the water soluble sulfate and boron compounds as insoluble impurities is formed;

C. separating said $MgCl_2$ solution from the insoluble impurities;

D. adding to the $MgCl_2$ solution about 3.0 moles of ethylene glycol per mole of $MgCl_2$ present so as to prepare a $MgCl_2 \cdot 3$ moles ethylene glycol complex precipitate;

E. separating said precipitate from the diethyl ether of tetraethylene glycol and recovering the precipitate;

F. dissolving said precipitate in ethylene glycol to prepare a solution of the precipitate in ethylene glycol said ethylene glycol being used in a quantity so as to prepare an ethylene glycol solution containing from 1 to 20% by weight $MgCl_2$;

G. treating the ethylene glycol magnesium chloride solultion with ammonia to form a magnesium chloride-ammonia complex which is insoluble in the ethylene glycol with the temperature of the ethylene glycol magnesium chloride solution being within the range of between −15° to 50°C;

H. separating the magnesium chloride-ammonia complex from the ethylene glycol;

I. washing the magnesium chloride-ammonia complex with a polar solvent having a lower boiling point than ethylene glycol to remove any ethylene glycol entrained in the magnesium chloride-ammonia complex;

J. heating the magnesium chloride-ammonia complex to a temperature sufficient to drive off the ammonia for a sufficient period of time to remove the ammonia, thereby forming anhydrous magnesium chloride; and then, K. recovering anhydrous magnesium chloride which has a magnesium oxide content of less than 0.8% by weight and which is substantially free of impurities.

3. The method of claim 2 wherein the azeotropic agent is toluene.

4. The method of claim 2 wherein 2.5 – 3.0 moles of ethylene glycol are added to the magnesium chloride solution in the diethyl ether of tetraethylene glycol so as to prepare a $MgCl_2 \cdot 3$ ($HOCH_2CH_2OH$) complex precipitate.

5. The method of claim 2 wherein the concentration of the magnesium chloride dissolved in the ethylene glycol is within the range of 8–12% by weight and the ethylene glycol anhydrous magnesium chloride solution is cooled to a temperature between 0°–25°C prior to ammonia addition thereto.

6. The method of claim 2 wherein polar solvent having a lower boiling point than ethylene glycol is from the group consisting of methanol and ethanol.

7. The method of claim 2 wherein the temperature sufficient to drive off the ammonia is within the range of 300° – 400°C.

* * * * *